US012555716B2

United States Patent
Eda et al.

(10) Patent No.: US 12,555,716 B2
(45) Date of Patent: Feb. 17, 2026

(54) COIL COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Tokyo (JP); Takamasa Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 866 days.

(21) Appl. No.: 17/866,860

(22) Filed: Jul. 18, 2022

(65) Prior Publication Data

US 2023/0022095 A1    Jan. 26, 2023

(30) Foreign Application Priority Data

Jul. 21, 2021   (JP) ................................ 2021-120282

(51) Int. Cl.
| | | |
|---|---|---|
| H01F 27/28 | (2006.01) | |
| H01F 27/02 | (2006.01) | |
| H01F 27/29 | (2006.01) | |
| H01F 27/32 | (2006.01) | |

(52) U.S. Cl.
CPC ....... H01F 27/2852 (2013.01); H01F 27/022 (2013.01); H01F 27/29 (2013.01); H01F 27/324 (2013.01)

(58) Field of Classification Search
CPC .... H01F 27/2852; H01F 27/022; H01F 27/29; H01F 27/324; H01F 27/292; H01F 27/323; H01F 2017/048; H01F 17/0013
USPC .................... 336/96, 200, 232, 192
See application file for complete search history.

(56) References Cited

U.S. PATENT DOCUMENTS

| | | | | |
|---|---|---|---|---|
| 9,064,626 | B2* | 6/2015 | Yoo ..................... | H01F 17/0013 |
| 2013/0300527 | A1* | 11/2013 | Kim ....................... | H01F 5/003 336/200 |
| 2015/0035634 | A1* | 2/2015 | Nakamura ............ | H01F 41/046 336/170 |
| 2017/0133145 | A1* | 5/2017 | Hong .................... | H01F 41/042 |
| 2021/0134515 | A1 | 5/2021 | Jung et al. | |
| 2021/0166858 | A1* | 6/2021 | Saito ....................... | H01F 27/29 |
| 2022/0181068 | A1* | 6/2022 | Kim .................... | H01F 17/0013 |

FOREIGN PATENT DOCUMENTS

| | | |
|---|---|---|
| JP | 2013-236062 A | 11/2013 |
| JP | 2015-130472 A | 7/2015 |
| JP | 2021-089936 A | 6/2021 |

OTHER PUBLICATIONS

Aug. 1, 2019, 2025 Office Action issued in Japanese Application No. 2021-120282.

* cited by examiner

*Primary Examiner* — Shawki S Ismail
*Assistant Examiner* — Kazi S Hossain
(74) *Attorney, Agent, or Firm* — Oliff PLC

(57) ABSTRACT

In a coil component, coupling coefficient is improved. In the coil component, the coupling position between the outer end portion of the first planar coil and the first lead-out portion is biased toward the second lead-out portion with respect to the center line of the first lead-out portion, whereby the length of the second planar coil not alongside with the outermost turn of the first planar coil is shortened. By shortening the length of the second planar coil, the coupling coefficient between the first coil portion and the second coil portion is increased.

6 Claims, 8 Drawing Sheets

COIL COMPONENT

CROSS-REFERENCE TO RELATED APPLICATIONS

This application is based upon and claims the benefit of priority from Japanese Patent Application No. 2021-120282, filed on 21 Jul. 2021, the entire contents of which are incorporated herein by reference.

TECHNICAL FIELD

The present disclosure relates to a coil component.

BACKGROUND

Well known in the art is a coil component provided with a plurality of coils in an element body. Japanese Unexamined Patent Publication No. JP2015-130472A discloses a coil component having two coils in an element body and four terminals.

SUMMARY

In the coil component as described above, element characteristics such as insertion loss are improved by increasing a coupling coefficient between coils. The inventors have made intensive studies and have newly found a technique capable of increasing the coupling coefficient.

According to the present disclosure, there is provided a coil component improved in coupling coefficient.

A coil component according to one aspect of the present disclosure includes an element body having a first end face and a second end face parallel to each other, an insulating substrate provided in the element body, orthogonal to the first end face and the second end face, and extending between the first end face and the second end face, a first coil portion provided on the insulating substrate and including a first planar coil and a first lead-out portion connected to an end portion of the first planar coil and led out to the first end face, a second coil portion provided on the insulating substrate and including a second planar coil provided to be wound alongside with the first planar coil on an inner peripheral side of the first planar coil and a second lead-out portion connected to an end portion of the second planar coil and led out to the first end face, and a pair of first external terminals provided on the first end face and connected to the first lead-out portion of the first coil portion and the second lead-out portion of the second coil portion, respectively, wherein a coupling position between the end portion of the first planar coil of the first coil portion and the first lead-out portion is biased toward the second lead-out portion with respect to a center position of the first lead-out portion.

In the above-described coil component, the coupling position between the end portion of the first planar coil of the first coil portion and the first lead-out portion is biased toward the second lead-out portion with respect to the center position of the first lead-out portion, whereby the length of the part of second planar coil not alongside with the first planar coil is shortened and a high coupling coefficient can be obtained between the first coil portion and the second coil portion.

In the coil component according to another aspect, a coupling position between the end portion of the second planar coil of the second coil portion and the second lead-out portion is biased toward the first lead-out portion with respect to a center position of the second lead-out portion. In this case, the length of the part of the second planar coil not alongside with the first planar coil is further shortened, and a higher coupling coefficient can be obtained.

In the coil component according to another aspect, the insulating substrate extends between the first lead-out portion and the second lead-out portion.

A coil component according to another aspect further includes an insulating portion located between the first lead-out portion and the second lead-out portion.

In the coil component according to another aspect, the element body includes metal magnetic powder and resin.

In the coil component according to another aspect, the insulating substrate is penetrated in a thickness direction at an outer peripheral edge of the first coil portion, and a constituent of the element body is present on the outer periphery of the insulating substrate.

In the coil component according to another aspect, a branching section of the first planar coil and the second planar coil is located between the first lead-out portion and the second lead-out portion when viewed from the first end face side.

DETAILED DESCRIPTION

Figure 1:
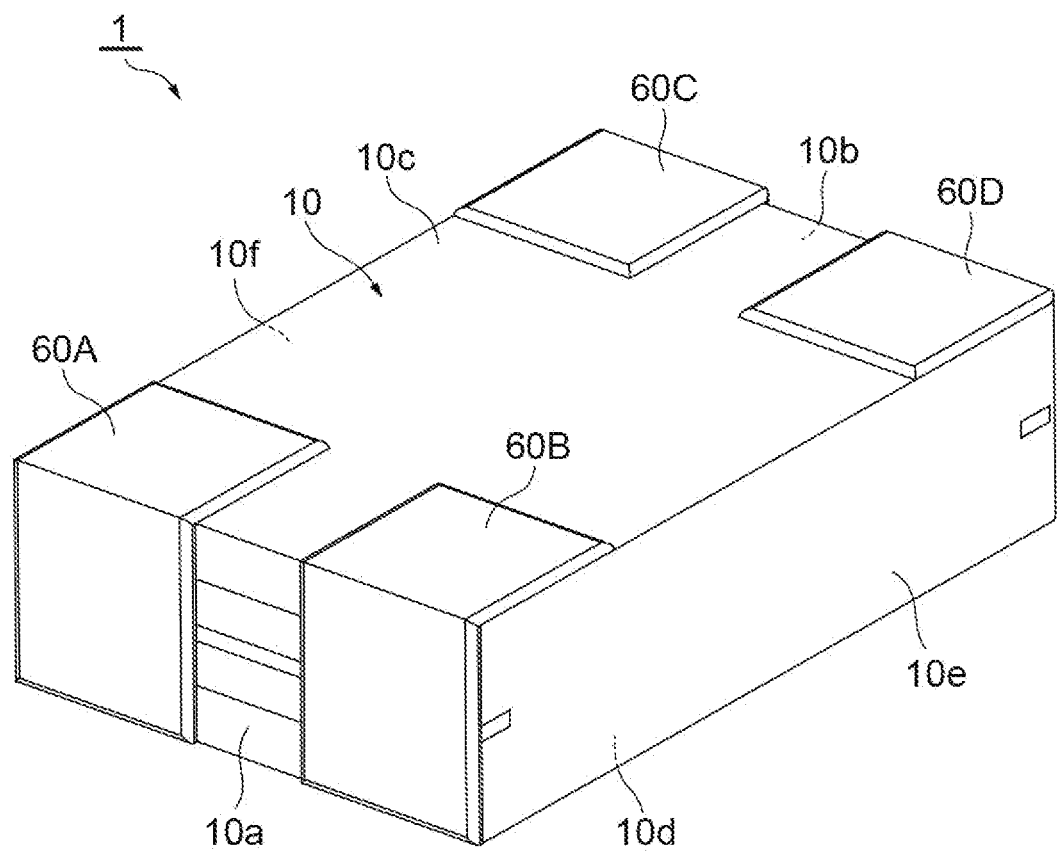
FIG. 1 is a schematic perspective view of a coil component according to an embodiment.

Hereinafter, embodiments of the present disclosure will be described in detail with reference to the accompanying drawings. In the description, the same reference numerals are used for the same elements or elements having the same functions, and redundant description will be omitted.

The coil component 1 according to one embodiment is, for example, a balun coil. The balun coil is used, for example, when a near field communication circuit (NFC circuit) is mounted on a cellular terminal, for example. The balun coil performs conversion between an unbalanced signal of the antenna and a balanced signal of the NFC circuit, thereby realizing connection between the unbalanced circuit and the balanced circuit. The coil component 1 can also be used for a common mode filter or a transformer.

As shown in FIG. 1, the coil component 1 includes an element body 10, a coil structure 20 embedded in the element body 10, and two pairs of external terminal electrodes 60A, 60B, 60C, and 60D provided on a face of the element body 10.

The element body 10 has a rectangular parallelepiped outer shape and has six faces 10a to 10f. As an example, the element body 10 is designed to have dimensions of long side 2.0 mm, short side 1.25 mm, and height 0.65 mm. Of the surfaces 10a to 10f of the element body 10, the end face 10a (first end face) and the end face 10b (second end face) are parallel to each other, the upper face 10c and the lower face 10d are parallel to each other, and the side face 10e and the side face 10f are parallel to each other. The upper face 10c of the element body 10 is connecting the pair of end faces 10a and 10b and is a face facing in parallel to a mounting face of the mounting substrate on which the coil component 1 is mounted.

The element body 10 is made of a metal magnetic powder-containing resin 12 which is one type of magnetic material. The metal magnetic powder-containing resin 12 contains a metal magnetic powder and a binder resin, and is a bound powder in which the metal magnetic powder is bound by the binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline, sendust, or the like. The binder resin is, for example, a thermosetting epoxy resin. In the present embodiment, the content of the metal magnetic powder in the bound powder is 80 to 92 vol % in terms of volume percent, and 95 to 99 wt % in terms of weight percent. From the viewpoint of magnetic properties, the content of the metal magnetic powder in the bound powder may be 85 to 92 vol % in terms of volume percent and 97 to 99 wt % in terms of weight percent. The magnetic powder of the metal magnetic powder-containing resin 12 may be a powder having one type of average particle diameter or may be a mixed powder having a plurality of types of average particle diameters.

The metal magnetic powder-containing resin 12 of the element body 10 integrally covers a coil structure 20 described later. Specifically, the metal magnetic powder-containing resin 12 covers the coil structure 20 from above and below and covers the outer periphery of the coil structure 20. The metal magnetic powder-containing resin 12 fills the inner peripheral region of the coil structure 20.

The coil structure 20 includes an insulating substrate 30, an upper coil structure 40A provided on an upper side of the insulating substrate 30, and a lower coil structure 40B provided on a lower side of the insulating substrate 30.

Figure 3:
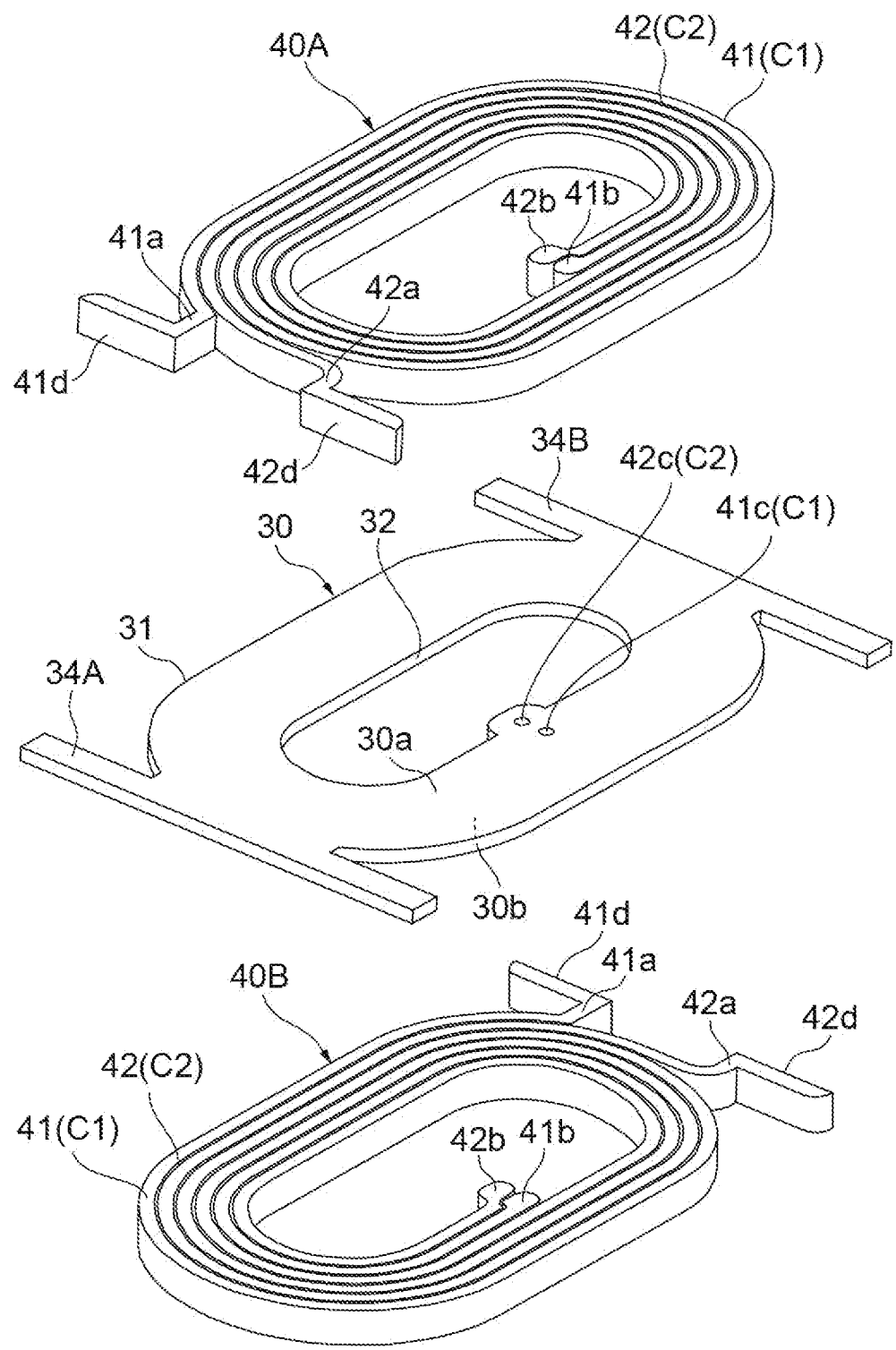
FIG. 3 is an exploded view of the coil shown in FIG. 2.

The insulating substrate 30 has a flat plate shape, extends between the end faces 10a and 10b of the element body 10, and is designed to be orthogonal to the end faces 10a and 10b. The insulating substrate 30 extends in parallel to the upper face 10c and the lower face 10d of the element body 10. As shown in FIG. 3, the insulating substrate 30 includes an elliptical ring-shaped coil forming portion 31 extending along the long-side direction of the element body 10, and a pair of frame portions 34A and 34B extending along the short-side direction of the element body 10 and sandwiching the coil forming portion 31 from both sides. An elliptical opening 32 extending along the long-side direction of the element body 10 is provided in a central portion of the coil forming portion 31.

The insulating substrate 30 is made of a nonmagnetic insulating material. The thickness of the insulating substrate 30 can be designed in a range of 10 to 60 μm, for example. In the present embodiment, the insulating substrate 30 has a configuration in which glass cloth is impregnated with epoxy resin. The resin constituting the insulating substrate 30 is not limited to the epoxy-based resin and may be a BT resin, polyimide, aramid, or the like. The insulating substrate 30 may be made of ceramic or glass. The constituent material of the insulating substrate 30 may be a mass-produced printed circuit board material. The insulating substrate 30 may be made of a plastic material used for a Bluetooth printed circuit board, a FR4 printed circuit board, or a FR5 printed circuit board.

Figure 2:
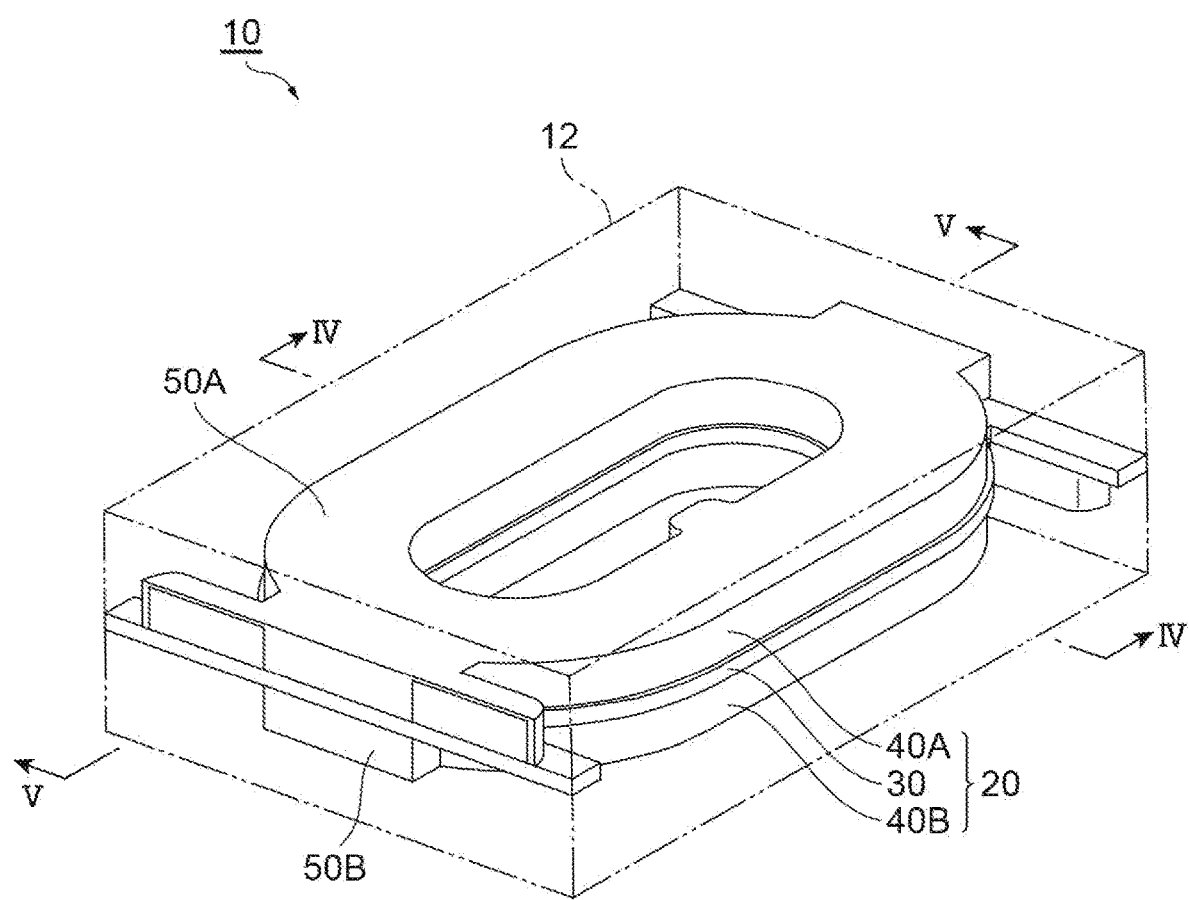
FIG. 2 shows the inside of the coil component of FIG. 1.

The upper coil structure 40A is provided on the substrate upper face 30a of the coil forming portion 31 of the insulating substrate 30. As shown in FIGS. 2 and 3, the upper coil structure 40A includes a first planar coil 41, a second planar coil 42, and an upper insulator 50A. The first planar coil 41 and the second planar coil 42 are wound alongside and adjacent to each other on the upper face 30a of the insulating substrate 30.

The first planar coil 41 is a substantially elliptical spiral air-core coil wound around the opening 32 of the coil forming portion 31 in the same layer on the upper face 30a of the insulating substrate 30. The number of turns of the first planar coil 41 may be one or a plurality of turns. In the present embodiment, the number of turns of the first planar coil 41 is three to four. The first planar coil 41 has an outer end portion 41a and an inner end portion 41b. The first planar coil 41 is designed to have a substantially uniform width from the outer end 41a to the inner end 41b. A first lead-out portion 41d is connected to the outer end portion 41a. The first lead-out portion 41d is provided in the frame portion 34A and exposed from the end face 10a of the element body 10. The inner end portion 41b is provided at an edge of the opening 32. The insulating substrate 30 is provided with a first through conductor 41c extending in the thickness direction of the insulating substrate 30 at a position overlapping the inner end portion 41b of the first planar coil 41. The first planar coil 41 is made of Cu, for example, and can be formed by electrolytic plating.

Similarly to the first planar coil 41, the second planar coil 42 is a substantially elliptical spiral air-core coil wound around the opening 32 of the coil forming portion 31 in the same layer on the upper face 30a of the insulating substrate 30. The second planar coil 42 is wound alongside and adjacent to the first planar coil 41 on the inner peripheral side of the first planar coil 41. The number of turns of the second planar coil 42 may be one or a plurality of turns. In the present embodiment, the number of turns of the second planar coil 42 is the same as the number of turns of the first planar coil 41. The second planar coil 42 has an outer end 42a and an inner end 42b. The second planar coil 42 is designed to have a substantially uniform width from the outer end portion 42a to the inner end portion 42b. Similarly to the first lead-out portion 41d connected to the outer end portion 41a of the first planar coil 41, a second lead-out portion 42d is connected to the outer end portion 42a. The first lead-out portion 41d is provided in the frame portion 34A and exposed from the end face 10a of the element body 10. The inner end 42b of the second planar coil 42 is provided at the edge of the opening 32 and is adjacent to the inner end 41b of the first planar coil 41. The insulating substrate 30 is provided with a second through conductor 42b extending in the thickness direction of the insulating substrate 30 at a position overlapping with the inner end portion 42b of the second planar coil 42. Similarly to the first planar coil 41, the second planar coil 42 is made of Cu, for example, and can be formed by electrolytic plating.

Figure 4:
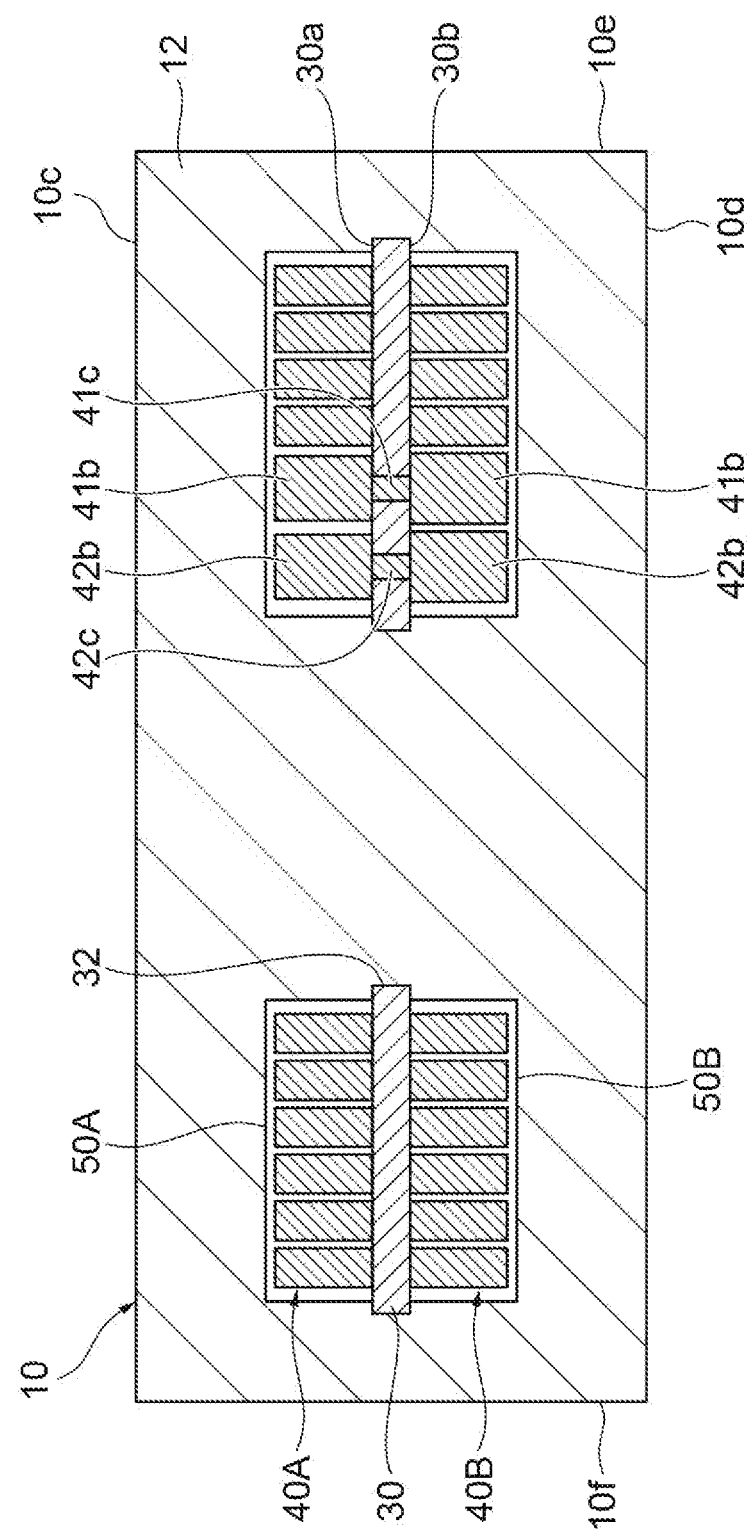
FIG. 4 is a cross-sectional view taken along line IV-IV of the coil component shown in FIG. 2.
Figure 5:
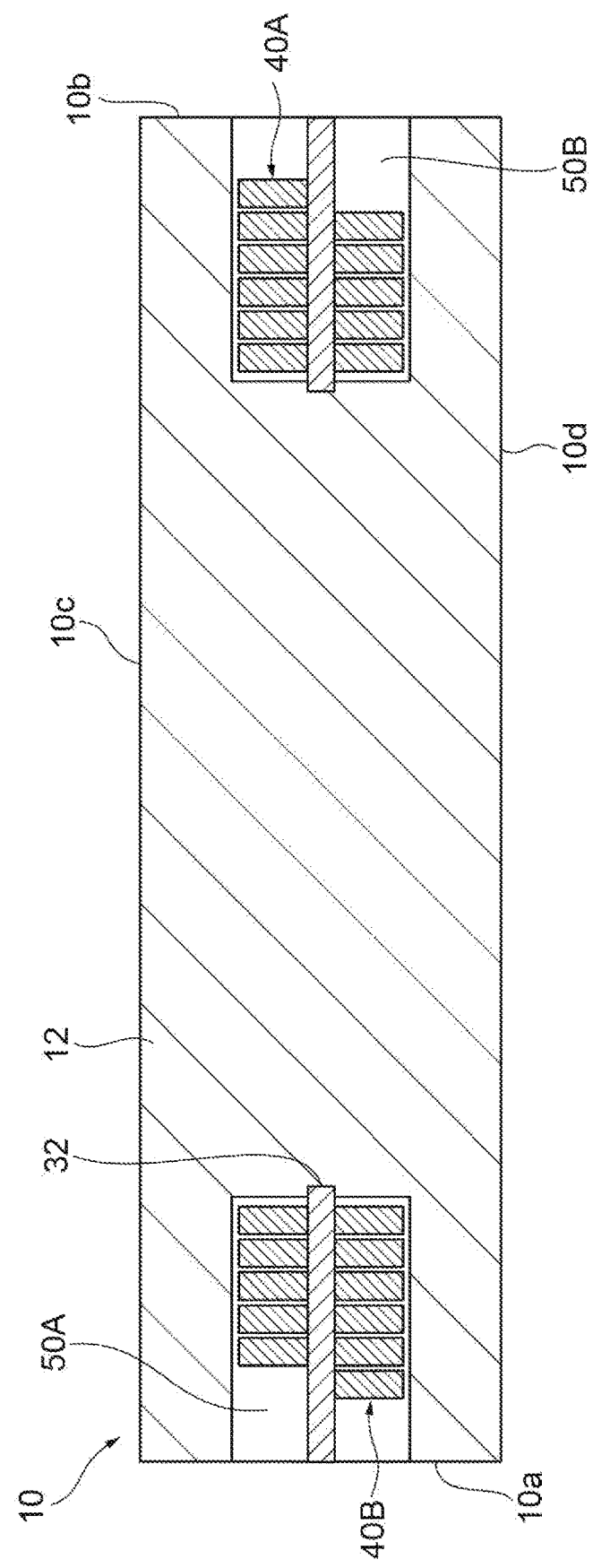
FIG. 5 is a cross-sectional view taken along line V-V of the coil component shown in FIG. 2.
Figure 6:
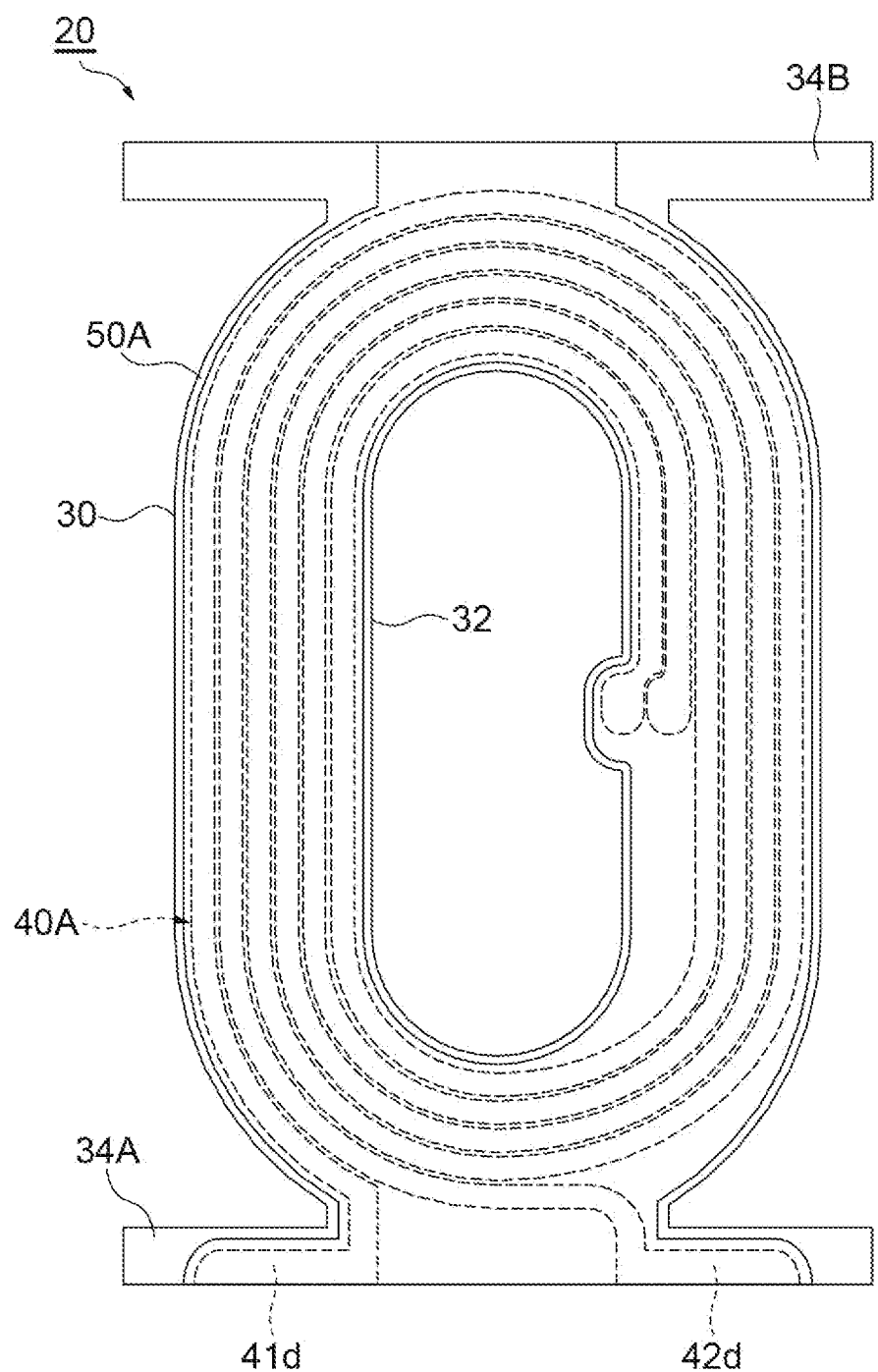
FIG. 6 is a plan view of the coil shown in FIG. 2.

The upper insulator 50A is provided on the upper face 30a of the insulating substrate 30 and is a thick-film resist patterned by known photolithography. The upper insulator 50A defines a plating growth region of the first planar coil 41 and the second planar coil 42. In the present embodiment, as shown in FIG. 4, the upper insulator 50A integrally covers the first planar coil 41 and the second planar coil 42, and more specifically, covers side faces and upper faces of the first planar coil 41 and the second planar coil 42. As shown in FIGS. 5 and 6, a portion of the upper insulator 50A extends from the inside of the element body 10 to the end face 10a of the element body 10 through between the first lead-out portion 41d and the second lead-out portion 42d, and is exposed at the end face 10a. Further, as shown in FIGS. 5 and 6, a part of the upper insulator 50A extends from the inside of the element body 10 to the end face 10b along the substrate upper face 30a and is exposed at the end face 10b. The upper insulator 50A is thicker than the first planar coil 41 and the second planar coil 42. The upper insulator 50A is made of, for example, epoxy.

The lower coil structure 40B is provided on the substrate lower face 30b of the coil forming portion 31 of the insulating substrate 30. As shown in FIGS. 2 and 3, the lower coil structure 40B includes a first planar coil 41, a second planar coil 42, and a lower insulator 50B. The first planar coil 41 and the second planar coil 42 are wound alongside and adjacent to each other on the lower face 30b of the insulating substrate 30.

The first planar coil 41 and the second planar coil 42 of the lower coil structure 40B are symmetrical to the first planar coil 41 and the second planar coil 42 of the upper coil structure 40A. Specifically, the first planar coil 41 and the second planar coil 42 of the lower coil structure body 40B have shapes obtained by inverting the first planar coil 41 and the second planar coil 42 of the upper coil structure 40A around axes parallel to the short sides of the element body 10.

The outer end portion 41a of the first planar coil 41 of the lower coil structure 40B is connected to a first lead-out portion 41d provided in the frame portion 34B and exposed from the end face 10b of the element body 10. The inner end portion 41a of the first planar coil 41 of the lower coil structure 40B overlaps the first through conductor 41c provided in the insulating substrate 30. Therefore, the inner end portion 41b of the first planar coil 41 of the lower coil structure 40B is electrically connected to the inner end portion 41b of the first planar coil 41 of the upper coil structure 40A via the first through conductor 41c. The first planar coil 41 of the lower coil structure 40B is made of Cu, for example, and can be formed by electrolytic plating.

The outer end portion 42a of the second planar coil 42 of the lower coil structure 40B is connected to a second lead-out portion 42d provided in the frame portion 34B and exposed from the end face 10b of the element body 10. The inner end portion 42b of the second planar coil 42 of the lower coil structure 40B overlaps the second through conductor 42c provided in the insulating substrate 30. Therefore, the inner end portion 42b of the second planar coil 42 of the lower coil structure 40B is electrically connected to the inner end portion 42b of the second planar coil 42 of the upper coil structure 40A via the second through conductor 42c. The second planar coil 42 of the lower coil structure 40B is made of, for example, Cu, and can be formed by electrolytic plating.

The lower insulator 50B is provided on the lower face 30b of the insulating substrate 30 and is a thick-film resist patterned by known photolithography. Like the upper insulator 50B, the lower insulator 50A defines a plating growth region for the first planar coil 41 and the second planar coil 42. In the present embodiment, as shown in FIG. 4, the lower insulator 50B integrally covers the first planar coil 41 and the second planar coil 42, and more specifically, covers side faces and upper faces of the first planar coil 41 and the second planar coil 42. Similarly to the upper insulator 50A, a portion of the lower insulator 50B extends from the inside of the element body 10 to the end face 10b of the element body 10 through a space between the first lead-out portion 41d and the second lead-out portion 42d and is exposed at the end face 10b. A portion of the lower insulator 50B extends along the lower face 30b from the inside of the element body 10 to the end face 10a and is exposed at the end face 10a. The lower insulator 50B is thicker than the first planar coil 41 and the second planar coil 42. The lower insulator 50B may have the same thickness as the upper insulator 50A. The lower insulator 50B is made of, for example, epoxy.

The element body 10 includes a pair of coil portions C1 and C2 constituting a double coil structure. The first coil portion C1 includes the first planar coil 41 of the upper coil structure 40A provided on the upper face 30a of the insulating substrate 30, the first planar coil 41 of the lower coil structure 40B provided on the lower face 30b of the insulating substrate 30, the first through conductor 41c connecting the first planar coils 41 on both faces, and the first lead-out portions 41d connected to the outer end portions 41a of each of the first planar coils 41. In the first coil portion C1, the first lead-out portion 41d connected to the outer end portion 41a of the first planar coil 41 of the upper coil structure 40A constitutes a first end portion, and the first lead-out portion 41d connected to the outer end portion 41a of the first planar coil 41 of the lower coil structure 40B constitutes a second end portion. The second coil portion C2 includes the second planar coil 42 of the upper coil structure 40a provided on the upper face 30a of the insulating substrate 30, the second planar coil 42 of the lower coil structure 40B provided on the lower face 30b of the insulating substrate 30, the second through conductor 42c connecting the second planar coils 42 on both faces, and the second lead-out portions 42d connected to the outer end portions 42a of each of the second planar coils 42. In the second coil portion C2, the second lead-out portion 42d connected to the outer end portion 42a of the second planar coil 42 of the upper coil structure 40A constitutes a first end portion, and the second lead-out portion 42d connected to the outer end portion 42a of the second planar coil 42 of the lower coil structure 40B constitutes a second end portion.

In the present embodiment, as shown in FIGS. 3 and 6, the frame portions 34A and 34B of the insulating substrate 30 extend between the first lead-out portion 41d and the second lead-out portion 42d. The upper insulator 50A extending to the end face 10a and the lower insulator 50B extending to the end face 10b are located between the first lead-out portion 41d and the second lead-out portion 42d.

The two pairs of external terminal electrodes 60A, 60B, 60C, and 60D are provided in pairs on the end faces 10a and 10b of the element body 10 that are parallel to each other. In the present embodiment, each of the external terminal electrodes 60A, 60B, 60C, and 60D is bent in an L shape and continuously covers the end faces 10a and 10b and the upper face 10c. Of the pair of external terminal electrodes 60A and 60B (first external terminals) provided on the end face 10a, the external terminal electrode 60A is connected to the first lead-out portion 41d connected to the outer end portion 41a of the first planar coil 41 of the upper coil structure 40A, and the external terminal electrode 60B is connected to the second lead-out portion 42d connected to the outer end portion 42a of the second planar coil 42 of the upper coil structure 40A. Of the pair of external terminal electrodes 60C and 60D (second external terminals) provided on the end face 10b, the external terminal electrode 60C is connected to the first lead-out portion 41d connected to the outer end portion 41a of the first planar coil 41 of the lower coil structure 40B, and the external terminal electrode 60D is connected to the second lead-out portion 42d connected to the outer end portion 42a of the second planar coil 42 of the lower coil structure 40B. The external terminal electrode 60A on the end face 10a and the external terminal electrode 60C on the end face 10b are located at positions corresponding to each other in the long-side direction of the element body 10. Similarly, the external terminal electrode 60B on the end face 10a and the external terminal electrode 60D on the end face 10b are located at positions corresponding to each other in the long-side direction of the element body 10.

In the present embodiment, the external terminal electrodes 60A, 60B, 60C, and 60D are made of resinous electrodes, for example, made of resins containing Ag powder. Each of the external terminal electrodes 60A, 60B, 60C, and 60D can be formed by applying an electrode paste, for example. In this case, the electrode paste can be transferred to the element body 10 using a mold or a roller. Further, the electrode paste can be printed on the element body 10 by screen printing.

Next, the shape of the first lead-out portion 41d will be described with reference to FIG. 7.

Figure 7:
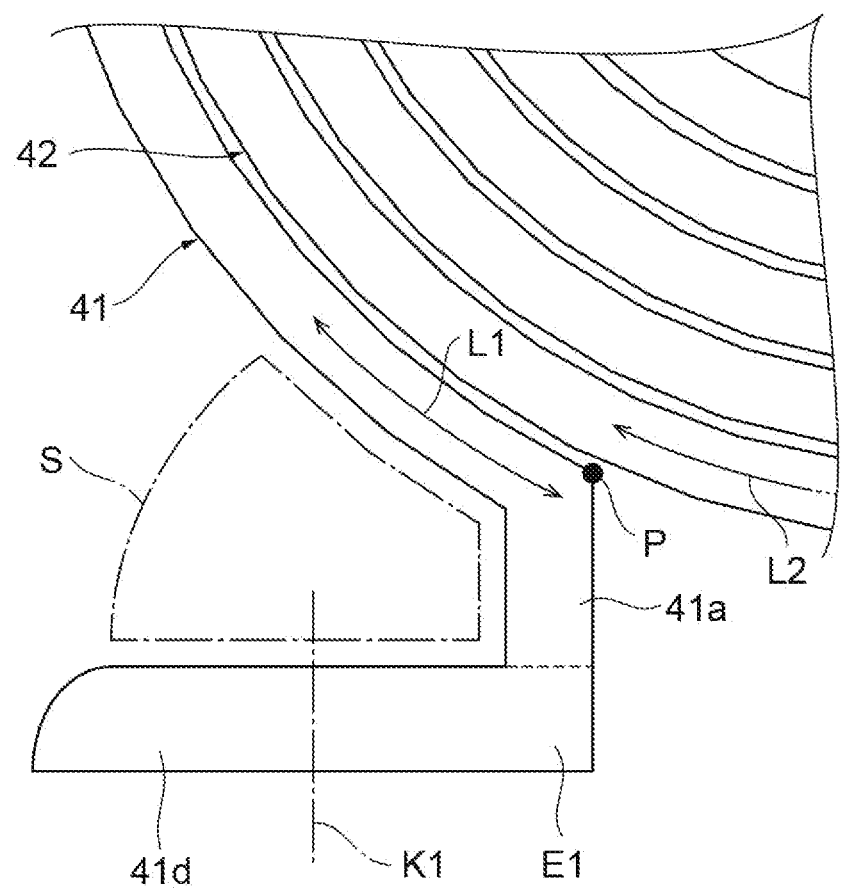
FIG. 7 is an enlarged view of a main portion of the coil portion shown in FIG. 6.

As shown in FIG. 7, the first lead-out portion 41d has a shape extending along the end face 10a when viewed from the thickness direction of the insulating substrate 30. The outer end portion 41a of the first planar coil 41 is connected on the right side of the center line K1 of the first lead-out portion 41d in the extending direction of the first lead-out portion 41d (the left-right direction in FIG. 7). More specifically, the outer end 41a of the first planar coil 41 is connected to the right end E1 of the first lead-out portion 41d. That is, the coupling position between the first lead-out portion 41d and the outer end portion 41a of the first planar coil 41 is biased to the right side (that is, the second lead-out portion 42d side) with respect to the center line K1 of the first lead-out portion 41d. Therefore, the length L1 of the portion of the outermost turn of the first planar coil 41 extending alongside with the outermost turn of the second planar coil 42 is extended. In other words, the length L2 of the portion of the outermost turn of the second planar coil 42 that is branched from the first planar coil 41 at the branch section P and is not alongside with the first planar coil 41 (i.e., the portion not paired with the outermost turn of the first planar coil 41) is shortened.

The branch section P may be located between the first lead-out portion 41d and the second lead-out portion 42d when viewed from the end face 10a side. The branch section P may be located at an intermediate point between the first lead-out portion 41d and the second lead-out portion 42d, for example.

As shown in FIG. 6, the insulating substrate 30 is penetrated through the outer peripheral edge of the first coil portion C1 in the thickness direction. Therefore, the metal magnetic powder-containing resin 12, which is a constituent of the element body, is present on the outer periphery of the insulating substrate 30. Therefore, as shown in FIG. 7, the metal magnetic powder-containing resins 12 are present in a region S surrounded by the outer peripheral edge of the outermost turn of the first planar coil 41 and the first lead-out portion 41d.

Figure 8:
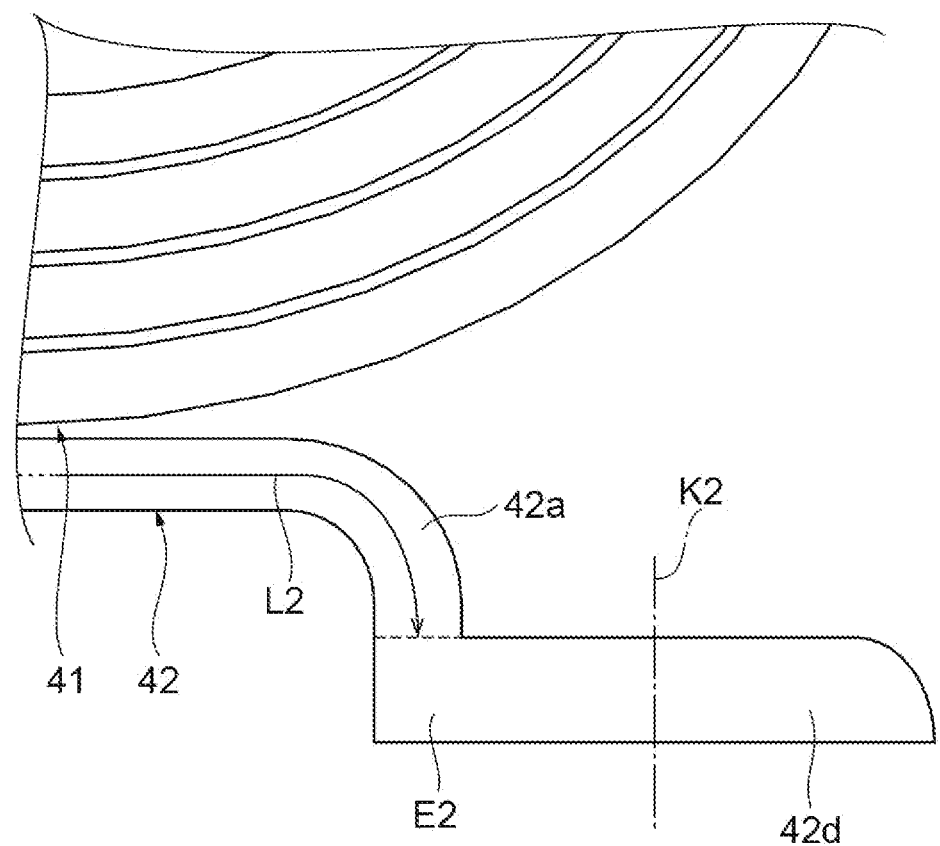
FIG. 8 is an enlarged view of a main portion of the coil portion shown in FIG. 6.

As shown in FIG. 8, similarly to the first lead-out portion 41d, the second lead-out portion 42d has a shape extending along the end face 10a when viewed from the thickness direction of the insulating substrate 30. The outer end portion 42a of the second planar coil 42 is connected on the left side of the center line K2 of the second lead-out portion 42d in the extending direction of the second lead-out portion 42d (the left-right direction in FIG. 8). More specifically, the outer end portion 42a of the second planar coil 42 is connected to the left end portion E2 of the second lead-out portion 42d. That is, the coupling position between the second lead-out portion 42d and the outer end portion 42a of the second planar coil 42 is biased to the left side (that is, the first lead-out portion 41d side) with respect to the center line K2 of the second lead-out portion 42d. Therefore, the length L2 of the outermost turn of the second planar coil 42 which is not alongside with the first planar coil 41 is shortened.

Although FIGS. 7 and 8 show the shapes of the first lead-out portion 41d and the second lead-out portion 42d on the end face 10a side, the first lead-out portion 41d and the second lead-out portion 42d on the end face 10b side also have the same or similar shape/positional relationship.

As described above, in the coil component 1, as shown in FIG. 7, the coupling position between the outer end portion 41a of the first planar coil 41 and the first lead-out portion 41d is biased toward the second lead-out portion 41d with respect to the center line K1 of the first lead-out portion 41d, so that the length L2 of the second planar coil 42 not alongside with the outermost turn of the first planar coil 41 is shortened. By shortening the length L2 of the second planar coil 42, the coupling coefficient between the first coil portion C1 and the second coil portion C2 is increased.

Further, in the coil component 1, as shown in FIG. 8, the coupling position between the outer end portion 42a of the second planar coil 42 and the second lead-out portion 42d is closer to the first lead-out portion 41d than the center line K2 of the second lead-out portion 42d, so that the length L2 of the second planar coil 42 is further shortened and a higher coupling coefficient is achieved.

Further, in the coil component 1, the frame portions 34A and 34B of the insulating substrate 30 extend between the first lead-out portion 41d and the second lead-out portion 42d, and the upper insulator 50A and the lower insulator 50B are located as insulating portions between the first lead-out portion 41d and the second lead-out portion 42d. Therefore, loops of magnetic fluxes are less likely to occur in portions of the second planar coil 42 that are not alongside with the outermost turns of the first planar coil 41, thereby achieving a higher coupling coefficient.

Further, in the coil component 1, as shown in FIG. 7, since the metal magnetic powder-containing resins 12 are present in the region S surrounded by the outer peripheral edge of the outermost turn of the first planar coil 41 and the first lead-out portion 41d, a higher coupling coefficient is achieved.

It should be noted that the present disclosure is not limited to the above-described embodiment and may take various forms.

For example, the number of turns of the first coil portion and the number of turns of the second coil portion can be increased or decreased as appropriate. Further, the element body of the coil portion may include three or more coil portions.

What is claimed is:

1. A coil component comprising:
    an element body having a first end face and a second end face parallel to each other, the element body including metal magnetic powder and resin;
    an insulating substrate provided in the element body, orthogonal to the first end face and the second end face, and extending between the first end face and the second end face;
    a first coil portion provided on the insulating substrate and including a first planar coil and a first lead-out portion connected to an end portion of the first planar coil and led out to the first end face;
    a second coil portion provided on the insulating substrate and including a second planar coil provided to be wound alongside with the first planar coil on an inner peripheral side of the first planar coil and a second lead-out portion connected to an end portion of the second planar coil and led out to the first end face; and a pair of first external terminals provided on the first end face and connected to the first lead-out portion of the first coil portion and the second lead-out portion of the second coil portion, respectively;

wherein a coupling position between the end portion of the first planar coil of the first coil portion and the first lead-out portion is biased toward the second lead-out portion with respect to a center position of the first lead-out portion, the insulating substrate is penetrated in a thickness direction at an outer peripheral edge of the first coil portion, and when viewed from the thickness direction of the insulating substrate, a constituent of the element body is present on an outer periphery of the insulating substrate and in a region surrounded by an outer peripheral edge of an outermost turn of the first planar coil and the first lead-out portion.

2. The coil component according to claim 1, wherein a coupling position between the end portion of the second planar coil of the second coil portion and the second lead-out portion is biased toward the first lead-out portion with respect to a center position of the second lead-out portion.

3. The coil component according to claim 1, wherein the insulating substrate extends between the first lead-out portion and the second lead-out portion.

4. The coil component according to claim 1, further comprising an insulating portion located between the first lead-out portion and the second lead-out portion.

5. The coil component according to claim 1, wherein the element body contains metal magnetic powder and resin.

6. The coil component according to claim 1, wherein a branching section of the first planar coil and the second planar coil is located between the first lead-out portion and the second lead-out portion when viewed from the first end face side.

* * * * *